United States Patent [19]

Son

[11] Patent Number: 5,483,396
[45] Date of Patent: Jan. 9, 1996

[54] CASSETTE HOLDER OPENING SYSTEM HAVING A DAMPER

[75] Inventor: Hee Chul Son, Incheon, Rep. of Korea

[73] Assignee: Daewoo Electronics Co., Ltd., Seoul, Rep. of Korea

[21] Appl. No.: 297,214

[22] Filed: Aug. 29, 1994

[30] Foreign Application Priority Data

Sep. 28, 1993 [KR] Rep. of Korea ............. 93-20239

[51] Int. Cl.$^6$ .................... G11B 15/675; F16F 15/20
[52] U.S. Cl. ................................. 360/96.6; 188/290
[58] Field of Search .................. 360/96.6, 96.5, 360/93, 95, 99.02, 99.06; 188/378, 39, 290

[56] References Cited

U.S. PATENT DOCUMENTS

| | | | |
|---|---|---|---|
| 4,342,135 | 8/1982 | Matsuo et al. | 16/82 |
| 4,365,525 | 12/1982 | Imazaike | 74/768 |
| 4,542,810 | 9/1985 | Shimbara | 188/290 |
| 4,576,252 | 3/1986 | Omata | 185/39 |
| 4,688,695 | 8/1987 | Hirohata | 220/336 |
| 4,757,400 | 7/1988 | Park | 360/96.5 |

Primary Examiner—Stuart S. Levy
Assistant Examiner—William J. Klimowicz
Attorney, Agent, or Firm—Nixon & Vanderhye

[57] ABSTRACT

A cassette holder opening system comprises a damper, the damping force of which varies according to the opened angle of a cassette holder. In the damper, according to the variation of the opened angle of the cassette angle, a rolling member travels along a screw, so that the frictional force between the rolling member and a friction member, or the damping force varies. Accordingly, the cassette holder is completely opened and the opening operation of the cassette holder is steady, and furthermore the manufacturing cost is reduced and the fabrication thereof is easy due to the simple construction.

5 Claims, 4 Drawing Sheets

FIG. 4A
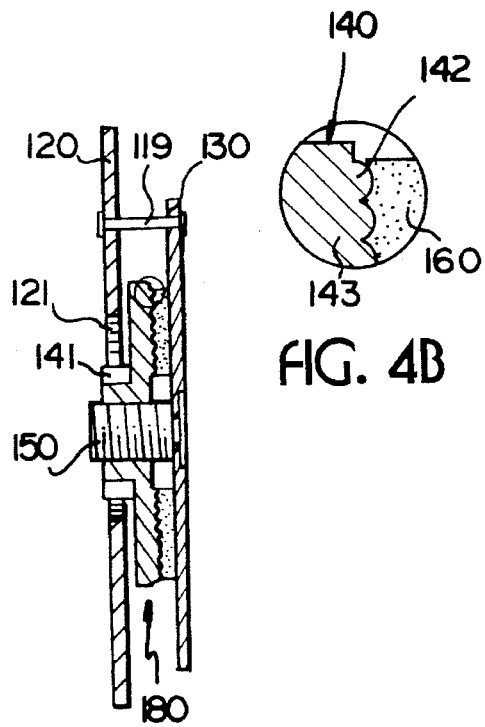
FIG. 4B
FIG. 5A
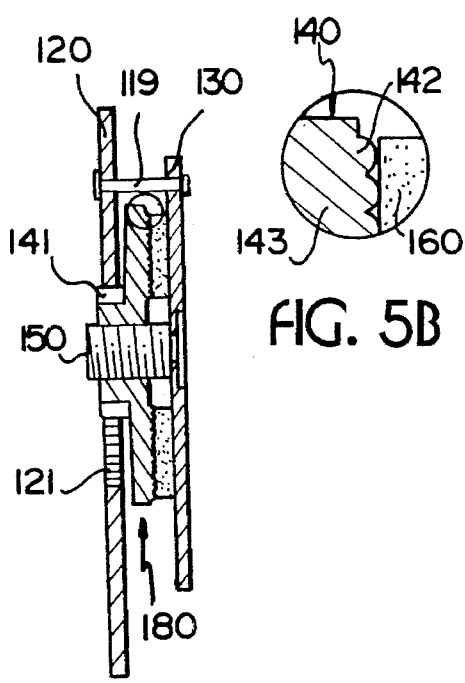
FIG. 5B
FIG. 6
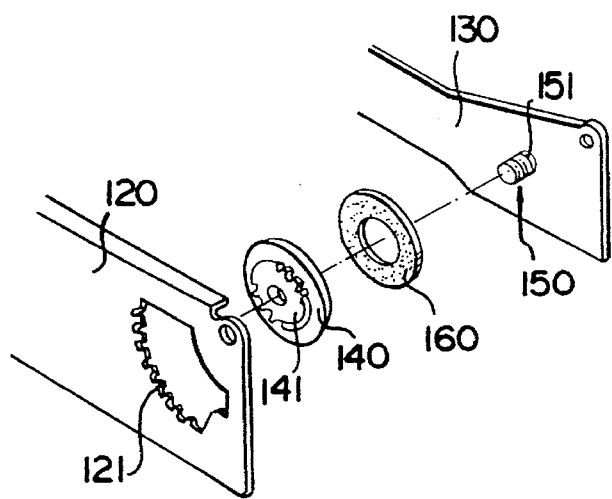

CASSETTE HOLDER OPENING SYSTEM HAVING A DAMPER

BACKGROUND OF THE INVENTION

1. Field of the Invention

The present invention relates to an opening system of a door-type cassette holder, and more particularly to a cassette holder opening system having a damper, the damping force of which varies according to the opened angle of a cassette holder.

2. Prior Art

A cassette holder 2 of door type as shown in FIG. 1, which is opened by the spring force of a spring 6, is used for a holder for receiving a tape cassette in a cassette player such as a camcorder, etc.

In the cassette holder 2, an impact or noise can be generated due to the abrupt opening of holder 2 when holder 2 is opened by the spring force of spring 6, the cassette or the holder may be broken easily and users may feel unpleasant in using the cassette. Therefore, highly required is a damper which can damp the impact or noise due to the abrupt opening of cassette holder 2 in opening cassette holder 2.

FIGS. 2 and 3 show a cassette holder opening system having a damper to meet the above-described requirement.

A damper 3 disposed in a cassette holder 2, as shown in FIG. 3, comprises an upper and lower cover 32 and 34, which are combined together to form a space therein. In the space between upper and lower cover 32 and 34, viscous liquid 37 is filled, and a first and second ring 38 and 39 are disposed to prevent leakage of viscous liquid 37. A rotation fan 35 is disposed rotatably at lower case 34 in such a manner to be immersed in viscous liquid 37 in the space so that viscous resistance is applied to the rotation thereof by viscous liquid 37.

Lower case 34 of damper 3 includes locking hooks 33 which are engaged with locking holes 13 of the cassette holder 2.

A sector gear 22 is formed at frame 4 in which a rolling gear 25 is engaged. A boss 36, one end of which is fixed to rotation fan 35, extends through upper case 32 and an opening 16 formed at cassette holder 2, which are coaxial with each other, to be fixed to rolling gear 25.

Meanwhile, spring 6 is disposed between cassette holder 2 and frame 4 to connect them with each other, and cassette holder 2 is pivotally attached to frame 4 by a hinge pin 5.

In a conventional cassette holder opening system having damper 3 of the above construction, spring 6 is elongated when cassette holder 2 is closed, and thereby a biasing force to open the cassette holder is applied to the cassette holder 2 by the spring force of the elongated spring 6. According as cassette holder 2 is opened, rolling gear 25 rolls upwards along sector gear 22. In this case, the rotation of rotation fan 35 is resisted by the viscous resistance of viscous liquid 37, so that the spring force of spring 6 is damped, and thereby the impact and noise due to the abrupt opening of cassette holder 2 are reduced.

Meanwhile, because one end of spring 6 is attached to frame 4 and the other end thereof is attached to cassette holder 2, the length of spring 6 is changed according to the opened angle of cassette holder 2, as shown in FIG. 2.

That is, the length of spring 6 becomes shorter according as the opened angle of cassette holder 2 becomes larger. In this case, because the spring force of spring 3 is proportional with the elongated length of spring 3, the spring force is reduced according as cassette holder 2 is opened. While, according as the opened angle of holder 2 increases, the opening velocity of holder 2 gradually increases due to the acceleration, so that damper 3 exhibits a gradually increasing damping force.

Therefore, though the abrupt opening of cassette holder 2 can be prevented by damping the opening of cassette holder 2 by damper 3, holder 2 is intermittently stopped in the course of being opened. Further, the spring force to open the cassette holder by spring 6 may be smaller than the damping force of damper 3 in the terminal stage of opening cassette holder 2, and thereby cassette holder 2 may not be opened completely.

Moreover, because damper 3 must be filled with viscous liquid 37 of gel state, the injection of the viscous liquid and the manufacture and maintenance of the damper are difficult, and the manufacturing cost thereof is increased due to the complicated construction thereof.

Meanwhile, U.S. Pat. No. 4,159,495 issued to Tsutsumi discloses an opening and closing device for cassette holder, which is adapted to damp any shock caused during opening operation of the cassette holder and at the same time to prevent occurrence of unpleasant shock noise. The opening and closing device for cassette holder comprises cooperating members in cooperation with an object to be opened and closed, a locking member for locking the cooperating members in the closed state of the object, and a rotative member for exerting damping effect on the object during opening and closing operation thereof by way of following the movement of the cooperating members.

However, the opening and closing device for cassette holder having the above construction requires a complicated mechanism consisting of separate members such as cooperating members, a locking member, and a rotative member, thereby the manufacture of the device is difficult and the manufacturing cost thereof is expensive.

SUMMARY OF THE INVENTION

The present invention has been made to overcome the above described problems of prior arts, and therefore it is an object of the present invention to provide a cassette holder opening system having a damper, which can alleviate impact liable to be applied to and noise liable to be generated by a cassette holder due to the abrupt opening thereof by damping the opening operation of the cassette holder, and guarantees smooth opening and closing operation of the cassette holder from the first to the last, and which can be easily manufactured.

To achieve the above object, the present invention provides a cassette holder opening system comprising:

a cassette holder for receiving a cassette tape;

a frame rotatably supporting the cassette holder and having a sector gear formed at a part thereof;

a spring member disposed between the cassette holder and the frame to connect them with each other so as to provide spring force for opening the cassette holder; and a damper for damping the spring force to open the cassette holder, the damping force of which varies according to the opened angle of the cassette holder.

Preferably, the damper of the device may comprise a shaft having a screw formed in the outer surface thereof and disposed at the holder;

a shaft having a screw formed in the outer surface thereof and disposed at the holder;

a friction member disposed coaxially with the shaft to be in contact with the cassette holder; and a rolling member having a body, a plurality of protrusions formed at one side of the body to be in contact with the friction member, and a rolling gear formed at the other side of the body to be engaged with the sector gear, the frictional force between the protrusions and the friction member varying by the travelling of the rolling member along the screw corresponding to the rolling of the rolling gear on the sector gear according to the opening and closing of the cassette holder.

In the cassette holder opening system of the present invention, according as the opened angle of the cassette holder is getting bigger, the spring force of the spring member or the force for opening the cassette is getting smaller, and at the same time the damping force of the damper is also getting smaller. Therefore, the cassette holder is opened even by reduced rotation force in the terminal stage of opening and the opening operation of the cassette holder becomes smooth.

BRIEF DESCRIPTION OF THE DRAWINGS

The above object, and other features and advantages of the present invention will be more apparent by describing the preferred embodiments in detail with reference to the accompanying drawings, in which:

FIG. 4A is a cross sectional view of a cassette holder opening system according to an embodiment of the present invention when the cassette holder is closed;

FIG. 4B is an enlarged view of a circle shown in FIG. 4A for showing the contact between the protrusions and the friction member;

FIG. 5A is a cross sectional view of the cassette holder opening system shown in FIG. 4A when the cassette holder is open;

FIG. 5B is an enlarged view of a circle shown in FIG. 5A for showing the contact between the protrusions and the friction member;

FIG. 6 is a perspective exploded view of a damper in a cassette holder opening system according to an embodiment of the present invention.

DESCRIPTION OF THE PREFERRED EMBODIMENT

Referring to FIGS. 4A, 4B, 5A and 5B showing cross sections of a cassette holder opening system according to an embodiment of the present invention, a cassette holder 130 for receiving a tape cassette is hingedly attached to a frame 120 by a pivot pin 119.

Figure 1:
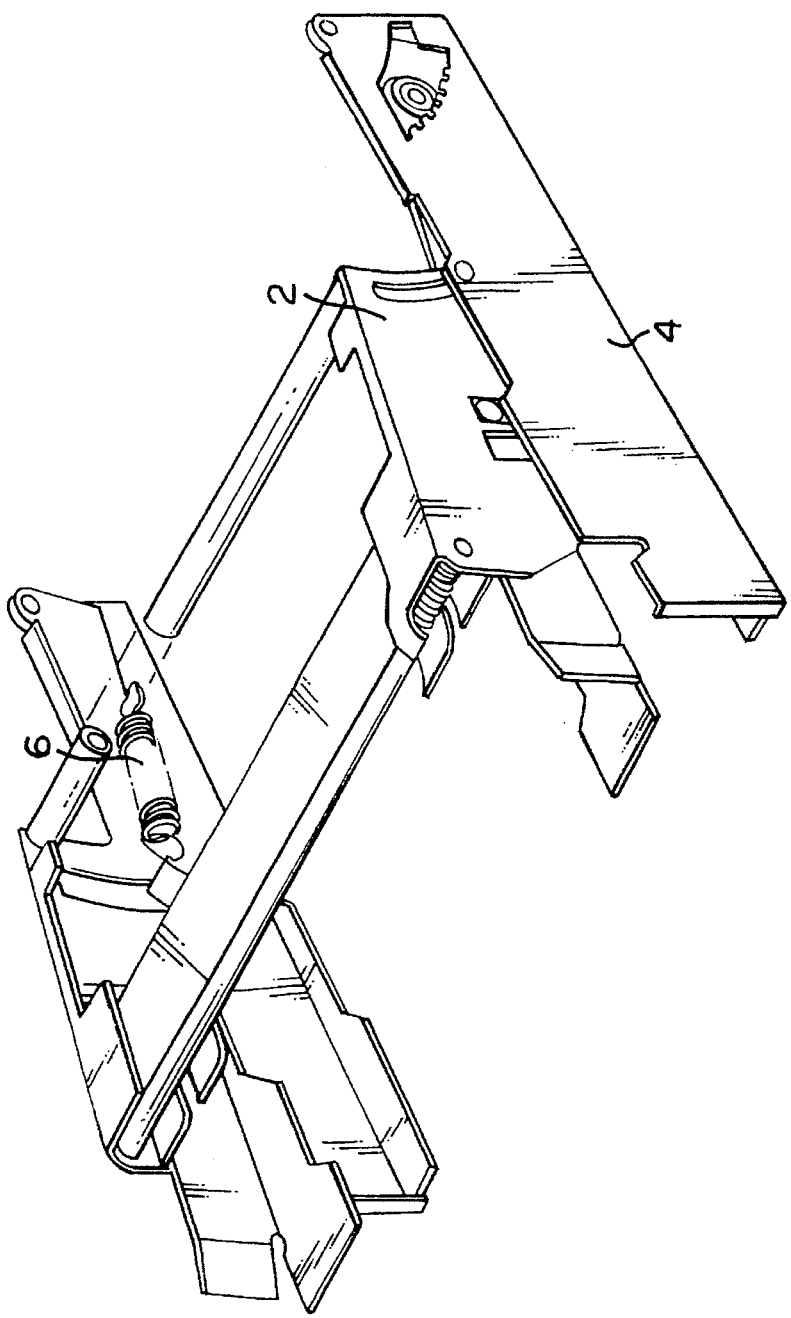
FIG. 1 is a schematic perspective view of a conventional cassette holder opening.
Figure 2:
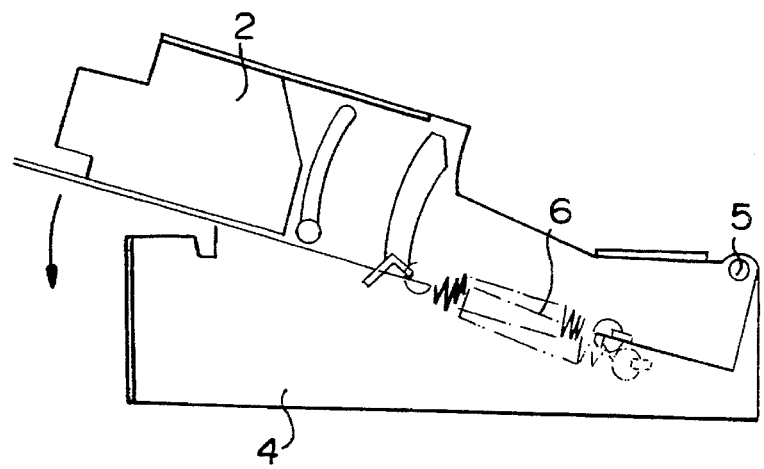
FIG. 2 is a schematic view for explaining the operation of a conventional cassette holder opening.
Figure 3:
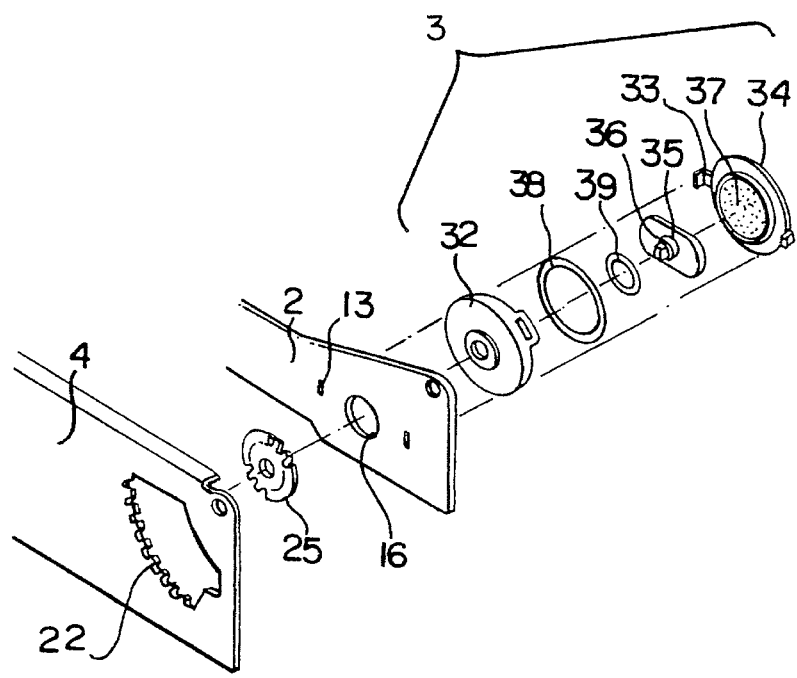
FIG. 3 is a perspective exploded view of a damper in a conventional cassette holder opening system.

In frame 120 and cassette holder 130 is disposed a spring 6 for connecting them with each other, which is not shown in FIGS. 4A, 4B, 5A and 5B but shown in FIG. 1.

A damper 180 for damping the spring force for opening cassette holder 130, the damping force of which is varied according to the opened angle of the cassette holder, is disposed between frame 120 and cassette holder 130.

Damper 180 includes a shaft 150 fixed on cassette holder 130 and having a screw formed on the outer peripheral surface thereof, a friction member 160 disposed on cassette holder 130 coaxially with shaft 150, and a rolling member 140 screwed on shaft 150. Rolling member 140 includes a body 143, a plurality of protrusions 142 formed at one side thereof which is in contact with friction member 160, and a rolling gear 141 formed incorporate therewith at the other side thereof. In frame 120 is formed a sector gear 121 in which rolling gear 141 of rolling member 140 is engaged to roll in a predetermined section thereof.

It is preferred that a plurality of protrusions 142, may be formed radially at one side of rolling member 140.

Figure 9:
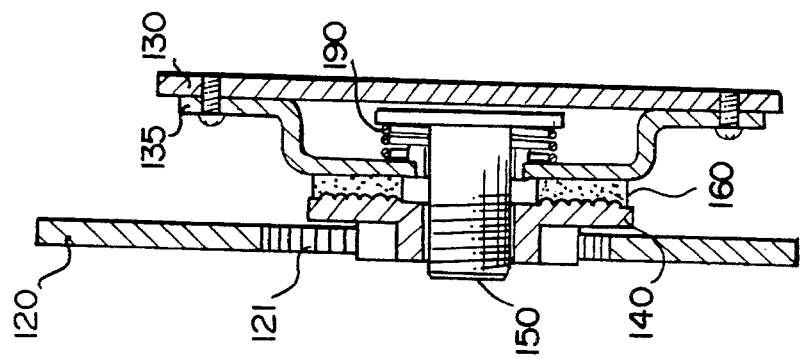
FIGS. 7 to 9 are cross sectional views of cassette holder opening systems according to other embodiments of the present invention.
Figure 8:
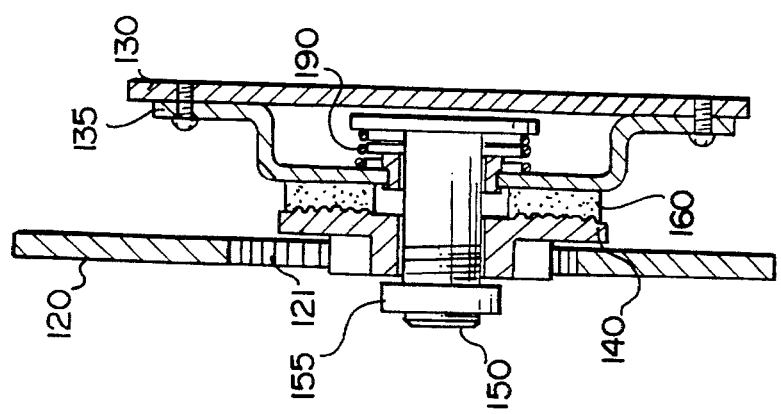
Figure 7:
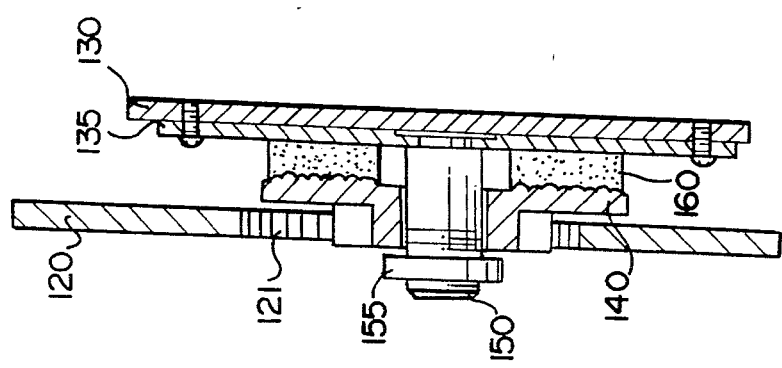

FIGS. 7 to 9 show several constructions of dampers 180 according to other embodiments of the present invention.

In other embodiments of the present invention, damper 180 may further comprise a control nut 155 disposed at shaft 150 to limit the travelling range of rolling member 140 travelling along the line of screw 151 on shaft 150 according as rolling gear 141 rolls along sector gear 121, as shown in FIGS. 7 and 8.

Damper 180 may further comprise a plate 135 disposed between friction member 160 and cassette holder 130 as shown in FIGS. 7 to 9, and damper 180 may furthermore comprise a compression spring 190 disposed between holder 130 and plate 135.

Hereinafter, the operation of a cassette holder opening system having the above construction according to several embodiments of the present invention will be described. First, spring 6 is in the elongated state thereof and rolling member 140 is engaged with sector gear 121 at the lower position thereof when cassette holder 130 is closed. In this case, rolling member 140 and friction member 160 are in close contact with each other.

Thereafter, when the ejection switch of a cassette player is pressed to open cassette holder 130, cassette holder 130 starts to be pivoted to be opened by the restoring force of spring 6. And then, rolling gear 141 rolls upward in sector gear 121, and thereby rolling member 140 travels along the line of screw 151 on shaft 150, so that protrusions 142 of rolling member 140 become apart from friction member 160 more and more. That is, according as cassette holder 130 is gradually opened, the frictional force between rolling member 140 and friction member 160 gradually becomes smaller. FIG. 5B shows an enlarged view of the contact between rolling member 140 and contact member 160 when cassette holder 130 is completely opened.

While cassette holder 130 is being closed again, rolling gear 141 rolls downward in sector gear 121, and thereby rolling member 140 travels along the line of screw 151 on shaft 150, so that protrusions 142 of rolling member 140 comes to be in contact with friction member 160 closer and closer. When cassette holder 130 is completely closed, the contact between protrusions 142 and friction member 160 becomes such as shown in FIG. 4B again.

Meanwhile, a displacement trace of one end of elastic spring 6 attached to cassette holder 130 is described as a parabola while cassette holder 130 is being opened. Therefore, according as cassette holder 130 is gradually opened the length of spring 6 becomes shorter, and thereby the restoring force of spring 6 becomes smaller, and at the same time, the frictional force between rolling member 140 and friction member 160 becomes smaller as described above.

Accordingly, in contrast to a conventional cassette holder opening system which has a defect that the cassette holder is not completely opened because the damping force of the damper is larger than the force for opening the cassette holder at the terminal stage of opening the cassette holder, in a cassette holder opening system of the present invention, cassette holder 130 can be completely opened at the terminal stage of opening cassette holder 130, because the damping force of damper 180 is reduced in proportion to the force for opening cassette holder 130.

Meanwhile, in an embodiment of the present invention that damper 180 further comprises a control nut 155 disposed on shaft 150 as shown in FIG. 7 or FIG. 8 the travelling range of rolling member 140 according to the pivoting or opening of cassette holder 130 can be limited by control nut 155. That is, a minimum frictional force between rolling member 140 and friction member 160 can be predetermined.

The minimum frictional force is an important factor, which can prevent cassette holder 130 from being abruptly opened and at the same time make cassette holder 130 be opened completely. In disposing control nut 155 to predetermine a proper minimum frictional force, the modulus of elasticity of spring 6, the weight of holder 130, the frictional force between rolling member 140 and friction member 160, etc., must be taken into account.

In another embodiment of the present invention as shown in FIG. 8 or FIG. 9 that damper 180 further comprises a compression spring 190 supporting shaft 150, compression spring 190 prevents an instant reduction of the frictional force between rolling member 140 and friction member 160 due to the backlash between rolling member 140 and screw 151 on shaft 150 while rolling member 140 travels along screw 151 on shaft 150 according as holder 130 is opened.

That is, while rolling member 140 travels along screw 151, shaft 150 is urged toward the opposite direction of the travelling direction of rolling member 140 by the biasing force of compression spring 190, so that rolling member 140 can travel with being in steady contact with friction member 160.

As described above, a cassette holder opening system of a cassette player according to the present invention adopts a damper, the damping force of which varies according to the opened angle of the cassette holder, so that the opening operation of the cassette holder can be steady. That is, noise or impact which may be generated at the terminal stage of opening the cassette due to the spring action is prevented, and furthermore the cassette holder can be opened by steady opening force because it is equipped with a damper which exhibits damping force varying proportionally to the variation of the spring force of the spring. Moreover, in a conventional opening system, the fabrication thereof is difficult and the construction thereof is complicated, while in a cassette holder opening system of the present invention, the fabrication thereof is simple and the number of components can be reduced because viscous liquid is not required but only a few components such as a rolling member and a friction member, the construction of which is simple, are required as components of damper.

It should, of course, be understood that the description and illustration of the embodiment and modified embodiments as mentioned above are merely illustrative and further modifications and changes may be made without any departure from the spirit of the present invention.

What is claimed is:

1. A cassette holder opening system comprising:

a cassette holder for receiving a cassette tape;

a frame for rotatably supporting the cassette holder, the frame having a sector gear formed at a part thereof, the cassette holder being hingedly attached to the frame by a pivot pin;

a spring member disposed between the cassette holder and the frame to connect them with each other so as to provide spring force for opening the cassette holder; and a damper for damping the spring force to open the cassette holder, the damping force of which varies according to the open angle of the cassette holder, the damper including a shaft fixed on the cassette holder and having a screw formed on an outer surface of the shaft, a friction member disposed coaxially with the shaft to be in contact with the cassette holder, and a rolling member so fitted on the shaft as to be guided along the screw of the shaft, the rolling member having a body, a plurality of protrusions formed at one side of the body to be in slidable contact with the friction member, and a rolling gear formed at the other side of the body to be engaged with the sector gear, wherein the rolling gear rolls along the sector gear, and thereby the rolling member is guided along the screw of the shaft, so that a distance between the friction member and the rolling member and accordingly the frictional force therebetween are changed, when the cassette holder is pivoted about the pivot pin.

2. A cassette holder opening system as claimed in claim 1, wherein the damper further comprises a control nut disposed at the shaft to limit the range that the rolling member travels.

3. A cassette holder opening system as claimed in claim 1, wherein the damper further comprises a plate disposed between the friction member and the cassette holder to hold the shaft.

4. A cassette holder opening system as claimed in claim 3, wherein the damper further comprises a compression spring disposed between the cassette holder and the plate to apply biasing force to the shaft so as to prevent the backlash between the rolling member and the screw of the shaft.

5. A cassette holder opening system as claimed in claim 1, wherein the plurality of protrusions are arranged radially.

* * * * *